(12) United States Patent
Hanna et al.

(10) Patent No.: US 10,295,427 B2
(45) Date of Patent: May 21, 2019

(54) MULTI-CHAMBER PRESSURE SENSING APPARATUS

(71) Applicant: Sensata Technologies, Inc., Attleboro, MA (US)

(72) Inventors: Tyler S. Hanna, Sutton, MA (US); Nicholas Papadeas, Franklin, MA (US); Christopher J. Fontana, Providence, RI (US)

(73) Assignee: Sensata Technologies, Inc., Attleboro, MA (US)

( * ) Notice: Subject to any disclaimer, the term of this patent is extended or adjusted under 35 U.S.C. 154(b) by 109 days.

(21) Appl. No.: 15/478,750

(22) Filed: Apr. 4, 2017

(65) Prior Publication Data

US 2018/0283974 A1   Oct. 4, 2018

(51) Int. Cl.
*G01L 19/14* (2006.01)
*G01L 19/00* (2006.01)

(52) U.S. Cl.
CPC ........ *G01L 19/147* (2013.01); *G01L 19/0007* (2013.01); *G01L 19/14* (2013.01); *G01L 19/142* (2013.01); *G01L 19/143* (2013.01); *G01L 19/148* (2013.01); *G01L 2019/0053* (2013.01)

(58) Field of Classification Search
CPC ..... G01L 19/147; G01L 19/143; G01L 19/14; G01L 19/148
USPC ......................................................... 73/756
See application file for complete search history.

(56) References Cited

U.S. PATENT DOCUMENTS

| | | | |
|---|---|---|---|
| 6,564,642 B1 | 5/2003 | Clifford | |
| 2003/0205127 A1* | 11/2003 | Borsch | B60T 13/52 91/1 |
| 2007/0209441 A1* | 9/2007 | Gunther | G01L 19/0038 73/712 |
| 2014/0033814 A1* | 2/2014 | Wen | G01L 19/14 73/146.5 |

FOREIGN PATENT DOCUMENTS

| | | | |
|---|---|---|---|
| EP | 3205995 A1 | 8/2017 | |
| WO | WO-2016102863 A1 * | 6/2016 | G01L 19/14 |

OTHER PUBLICATIONS

English machine translation for WO 2016102863.*
Combined Search and Examination Report from related Great Britain Application No. GB1804222.6 dated Sep. 17, 2018.

* cited by examiner

*Primary Examiner* — Daniel S Larkin
*Assistant Examiner* — Anthony W Megna Fuentes
(74) *Attorney, Agent, or Firm* — Burns & Levinson, LLP; Joseph M. Maraia (57) ABSTRACT

A pressure sensing apparatus with multiple, isolated pressure sensors provided therein. The apparatus includes a base cover portion having multiple sections and each section defines an opening. A sensor is positioned in each base cover portion and a portion of each sensor is exposed to the respective opening. A flanged base is coupled to the base cover portion to define multiple separate chambers and a housing is provided around the base cover portion and base and the housing has multiple conduits in fluid connection with respective cover openings.

12 Claims, 15 Drawing Sheets

MULTI-CHAMBER PRESSURE SENSING APPARATUS

BACKGROUND OF THE INVENTION

The use of sensors and controls in automotive applications has increased tremendously over recent years. This has created a demand for multiple transducers or sensors that need to be contained within a small, confined area. In one instance, the close proximity of pressure outlets in an automotive application has challenged transducer suppliers to provide a solution to such a configuration.

What is needed is a pressure sensor that meets the configuration requirements of the industry while providing the necessary level of performance.

BRIEF SUMMARY OF THE INVENTION

In one aspect of the present disclosure, a sensing apparatus includes a base cover defining a plurality of sections, each of the sections having a respective base cover opening; and a plurality of sensors, each sensor positioned in a respective base cover section, wherein a portion of each sensor is evidenced in the respective base cover opening. A base is coupled to the base cover and configured to define a plurality of chambers, each chamber corresponding to a respective base cover section; and a housing having a bottom surface with a plurality of inlets defined therein is provided. The base and base cover are positioned in the housing such that the base extends through an opening defined in the housing, and each inlet is in fluid connection with a respective base cover opening, and an edge of the housing is configured to couple to a portion of the base.

In another aspect of the present disclosure, a pressure sensing apparatus includes an oblong base cover portion comprising first and second base cover sections, where each of the first and second base cover sections has an opening defined therein; and first and second sensors are positioned, respectively, in the first and second base cover sections, a portion of each sensor evidenced in the respective opening. An oblong base comprising a flanged portion is coupled to the base cover portion to define first and second separate chambers corresponding, respectively, with the first and second base cover sections; and an oblong housing is disposed about the base cover portion and base, the housing having first and second inlets in fluid connection with the respective first and second base openings, and the housing defining an oblong opening through which the base extends, wherein an edge of the housing oblong opening is crimped to couple to the flanged portion of the base.

BRIEF DESCRIPTION OF THE DRAWINGS

Various aspects of at least one embodiment of the present disclosure are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the invention. In the figures.

DETAILED DESCRIPTION

In the following detailed description, numerous specific details are set forth in order to provide a thorough understanding of the embodiments of the present disclosure. It will be understood by those of ordinary skill in the art that these embodiments may be practiced without some of these specific details. In other instances, well-known methods, procedures, components and structures may not have been described in detail so as not to obscure the described embodiments.

Prior to explaining at least one embodiment in detail, it is to be understood that these are not limited in their application to the details of construction and the arrangement of the components set forth in the following description or illustrated in the drawings. Also, it is to be understood that the phraseology and terminology employed herein are for the purpose of description only and should not be regarded as limiting.

Figure 1:
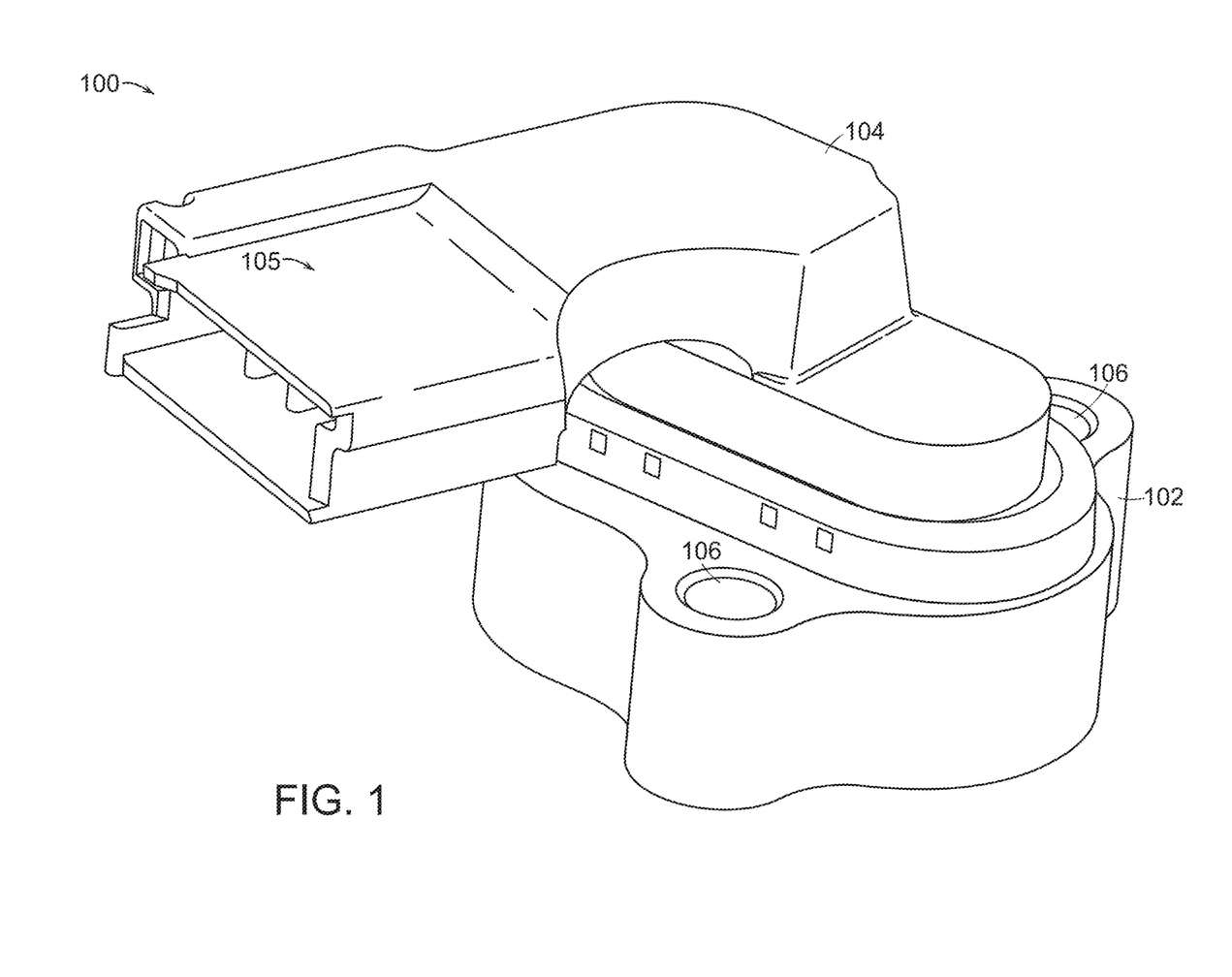
FIG. 1 is a perspective view of a pressure sensing apparatus in accordance with an aspect of the present disclosure.

As shown in FIG. 1, a pressure sensing apparatus 100 includes an oblong housing 102 and an associated base 104. In one embodiment, the base 104 includes a plug portion 105 for coupling to a cabling interface in, for example, an automotive application of the apparatus 100. In one embodiment, the housing 102 may include one or more mounting eyelets 106. In one embodiment, the housing 102 is made from aluminum and the base 104 is made from a plastic.

Figure 2:
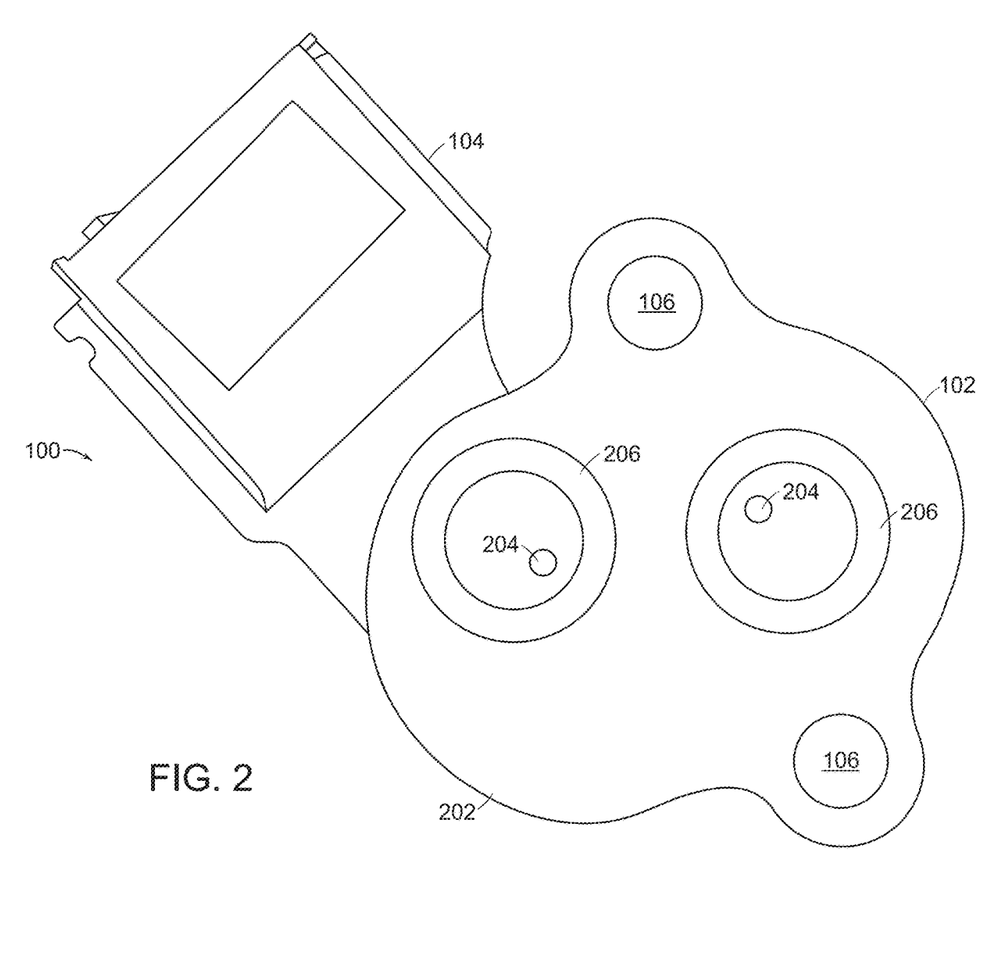
FIG. 2 is a bottom view of the pressure sensing apparatus of FIG. 1.

The housing 102 includes a bottom surface 202, referring to FIG. 2, with two inlets 204 defined to fluidly couple with an inner space 302 (see FIG. 3A) of the housing 102. An external seal 206, for example, a rubber O-ring, is disposed on the bottom surface 202 around each inlet 204.

Figure 3A:
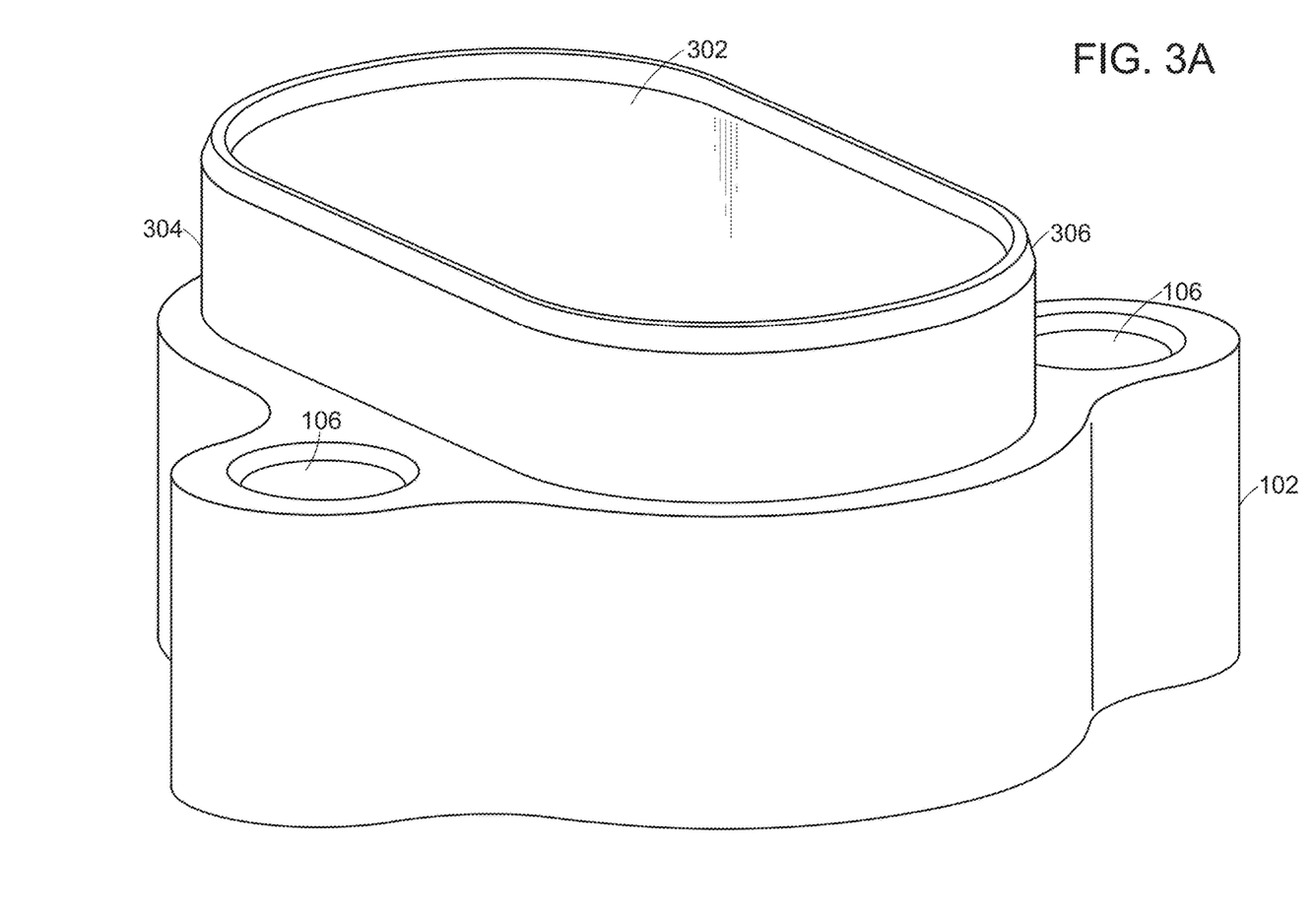
FIGS. 3A and 3B are views of a housing portion of the pressure sensing apparatus of FIG. 1.
Figure 3B:
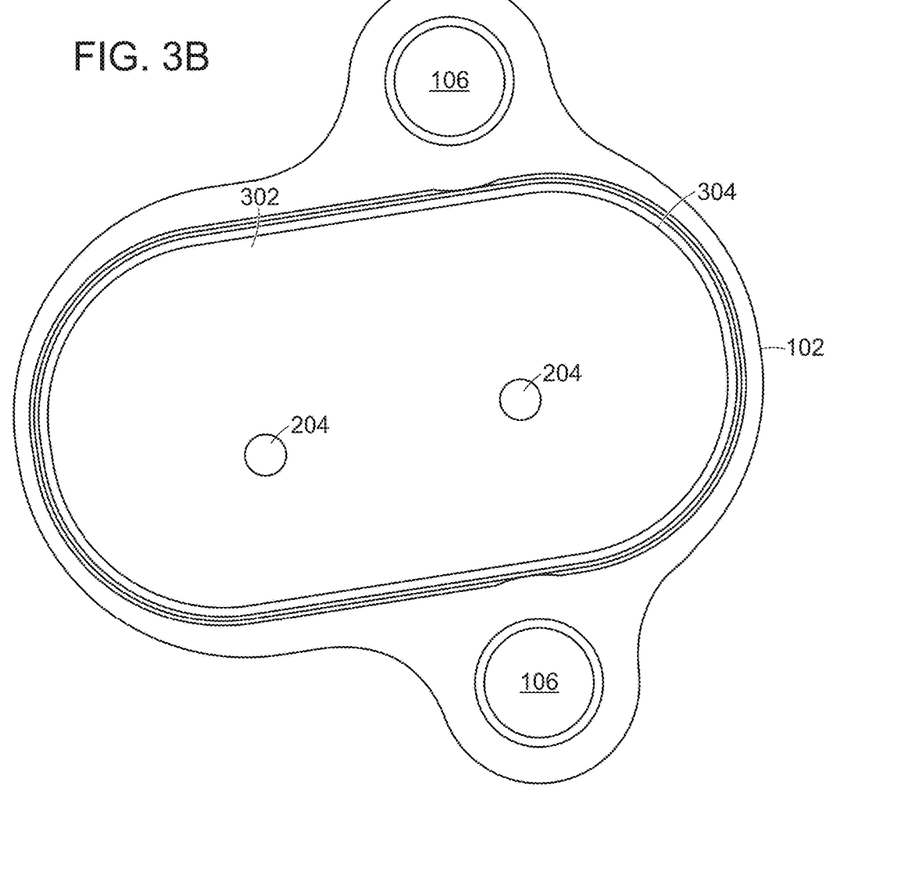

The housing 102 defines the inner space 302 that is bounded by a wall portion 304 having an upper section defined as a vertical lip 306. The spacing of the inlets 206, as shown in FIG. 3B, is determined by the geometry of the location of where the sensing apparatus 100 will be placed.

Figure 4:
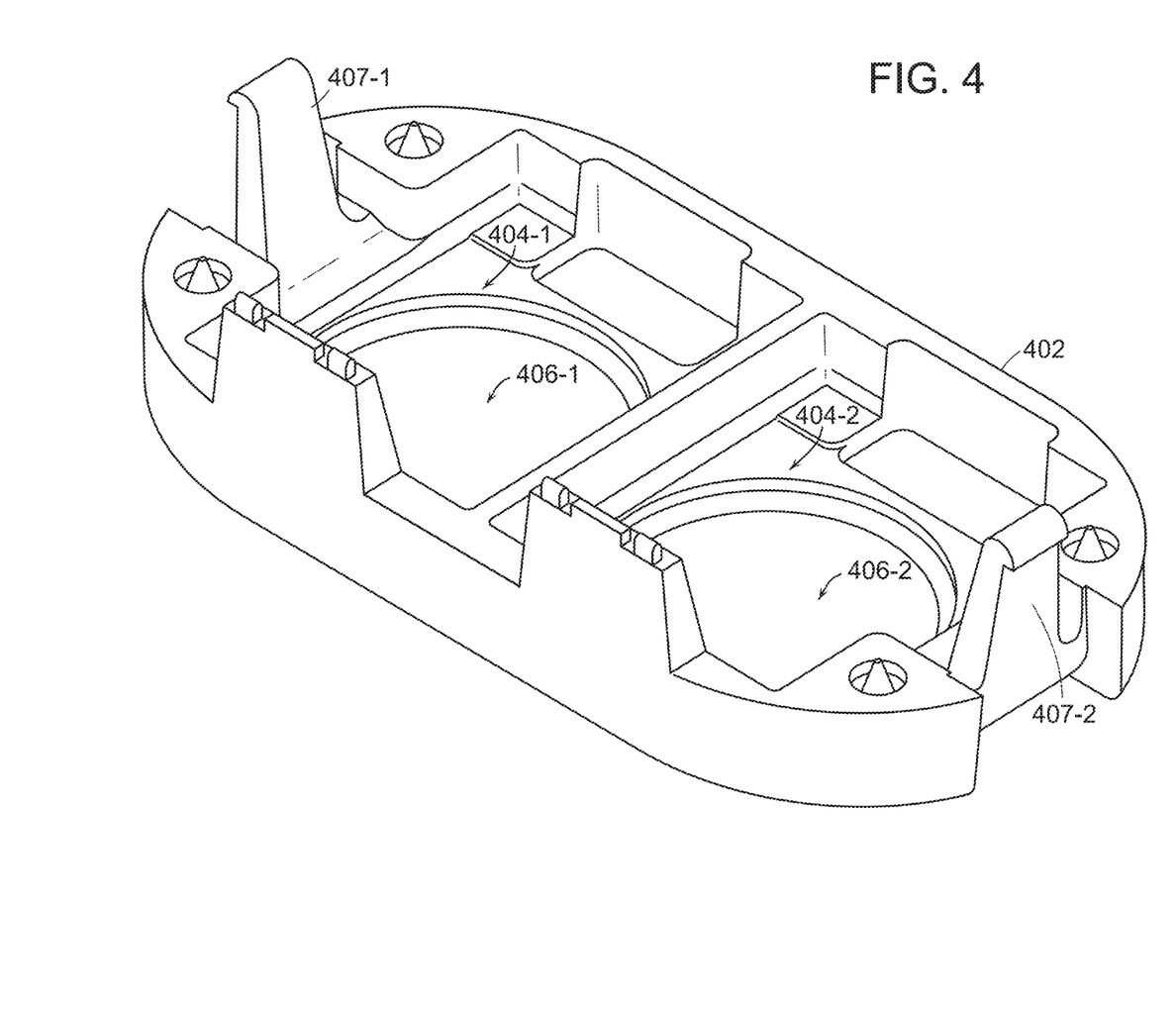
FIG. 4 is a perspective view of the base cover portion of the pressure sensing apparatus of FIG. 1.

An oblong base cover portion 402, as shown in FIG. 4, is provided and configured for coupling to the base 104 and placement within the space 302. The base cover portion 402 defines two sections 404-1, 404-2, each having a respective opening 406-1, 406-2. The base cover portion 402 includes two fingers 407-1, 407-2 that are used to couple the base cover portion 402 to respective openings in the base 104. The base cover portion 402 is configured such that when the base cover portion 402 is provided within the housing 102, an inlet 204 is visible in the respective opening 406.

Figure 5A:
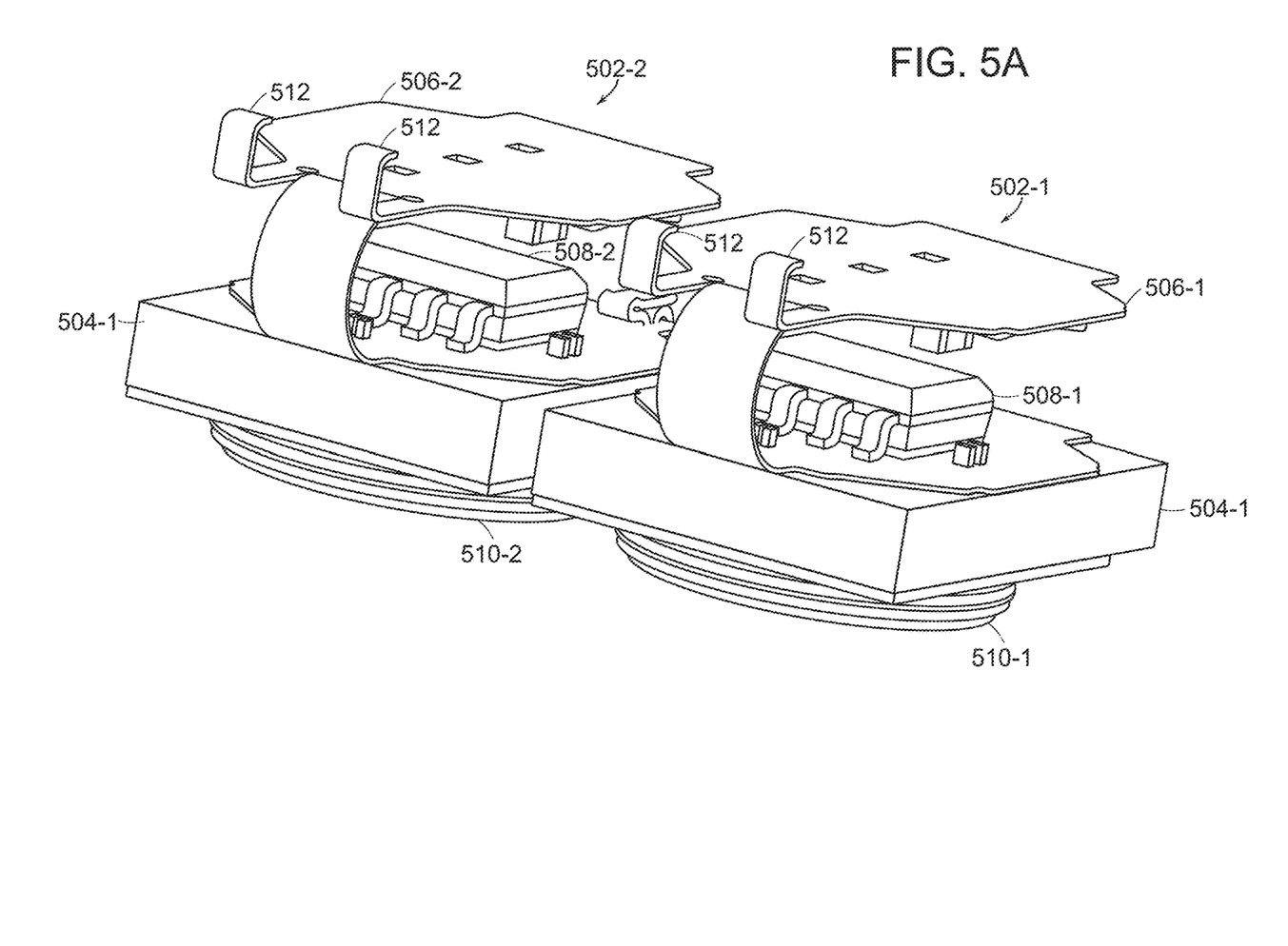
FIGS. 5A-5C are perspective views of pressure sensor assemblies provided in the pressure sensing apparatus of FIG. 1.
Figure 5B:
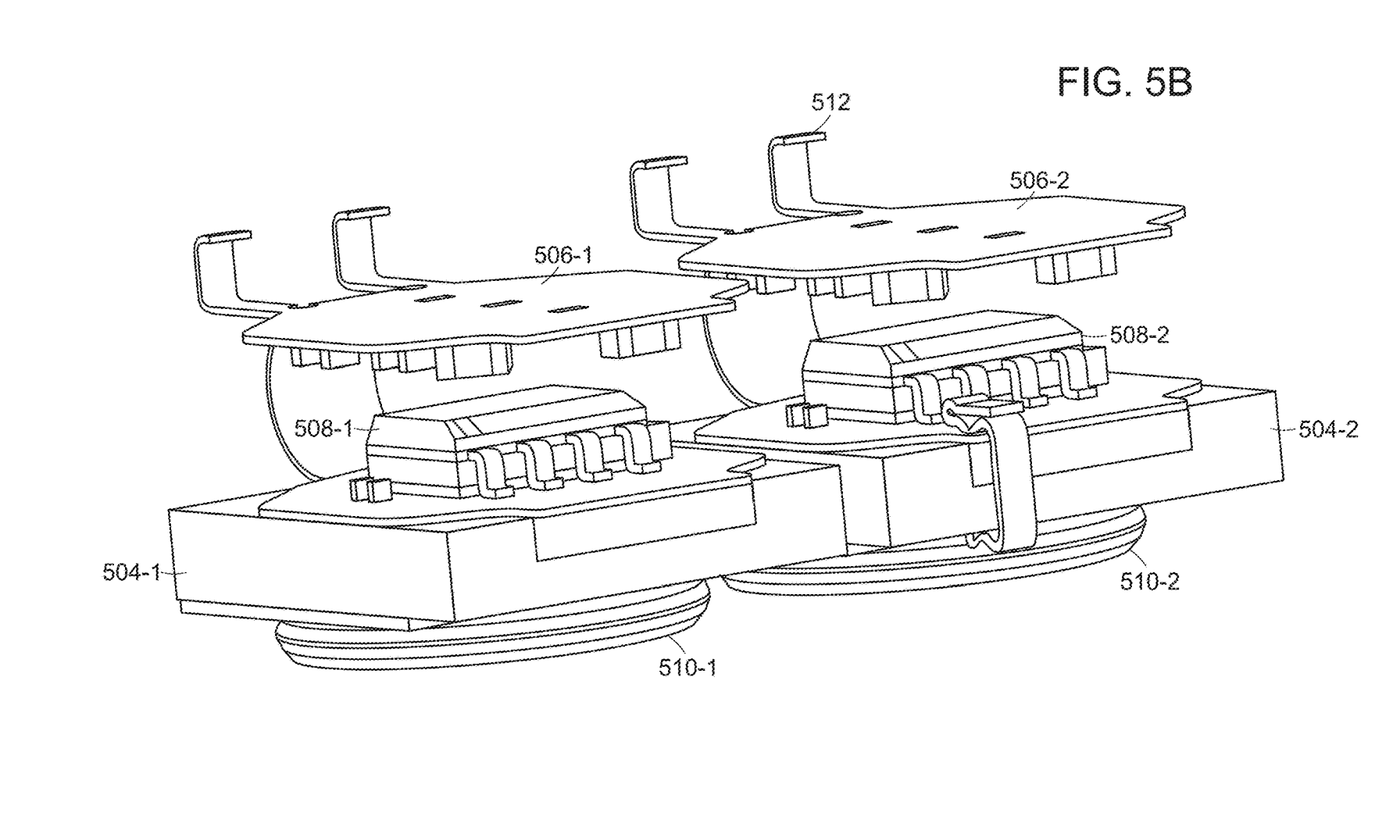
Figure 5C:
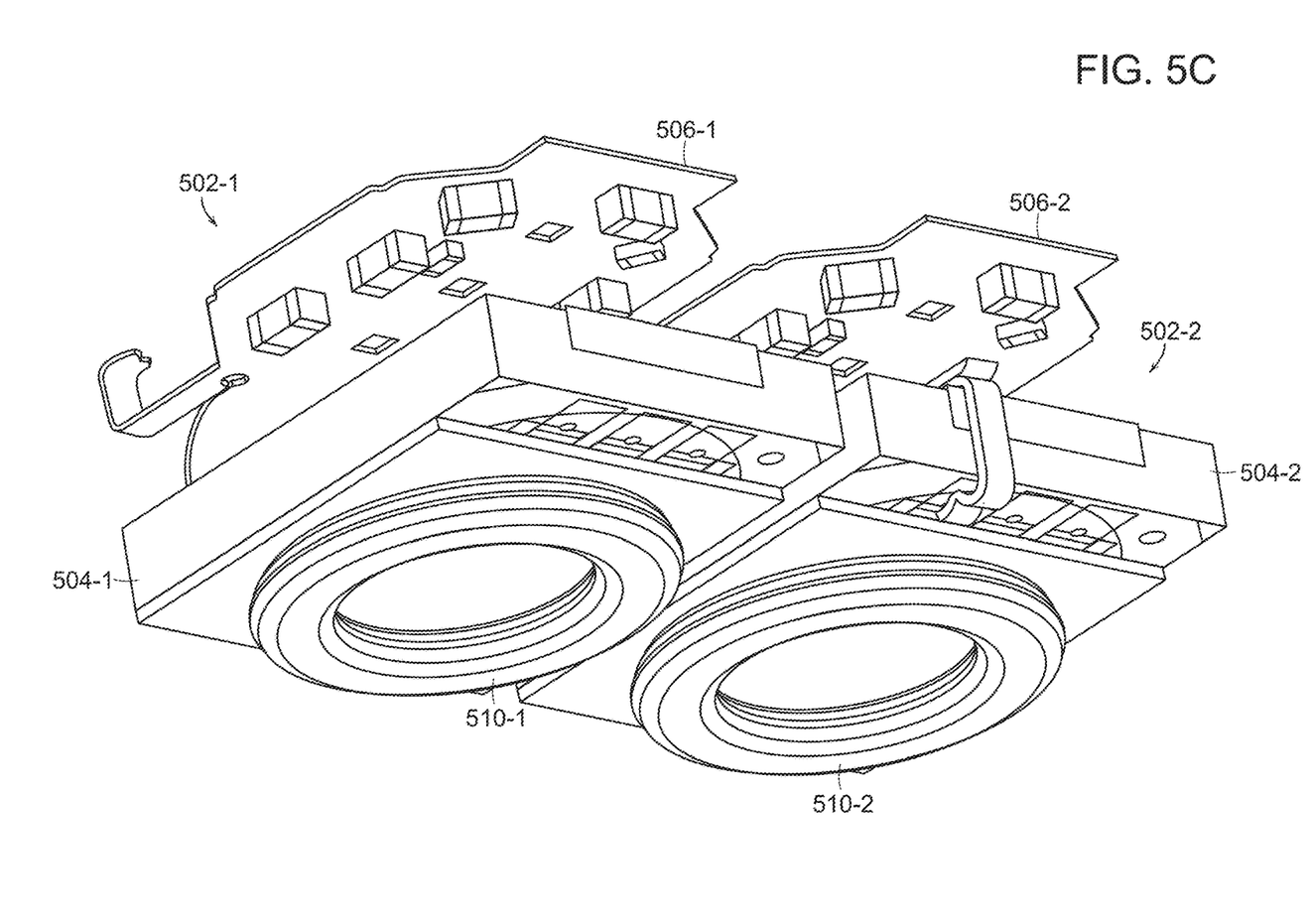

Two pressure sensing assemblies 502-1, 502-2 are provided, as shown in FIGS. 5A-5C. Each pressure sensing assembly 502 includes a sense element 504, for example, a parallel plate capacitor, a flexible circuit 506, support circuitry and components 508 mounted on the flexible circuit 506 and an internal seal 510. Each flexible circuit 506 includes two ground clips or tails 512 that couple to the housing 102 to provide a ground connection for those applications that require such a feature. The pressure sensing assembly can be similar to the one described in U.S. Pat. No. 6,487,911 entitled "Pressure Sensor Apparatus," the entire contents of which is incorporated herein by reference for all purposes.

Figure 6:
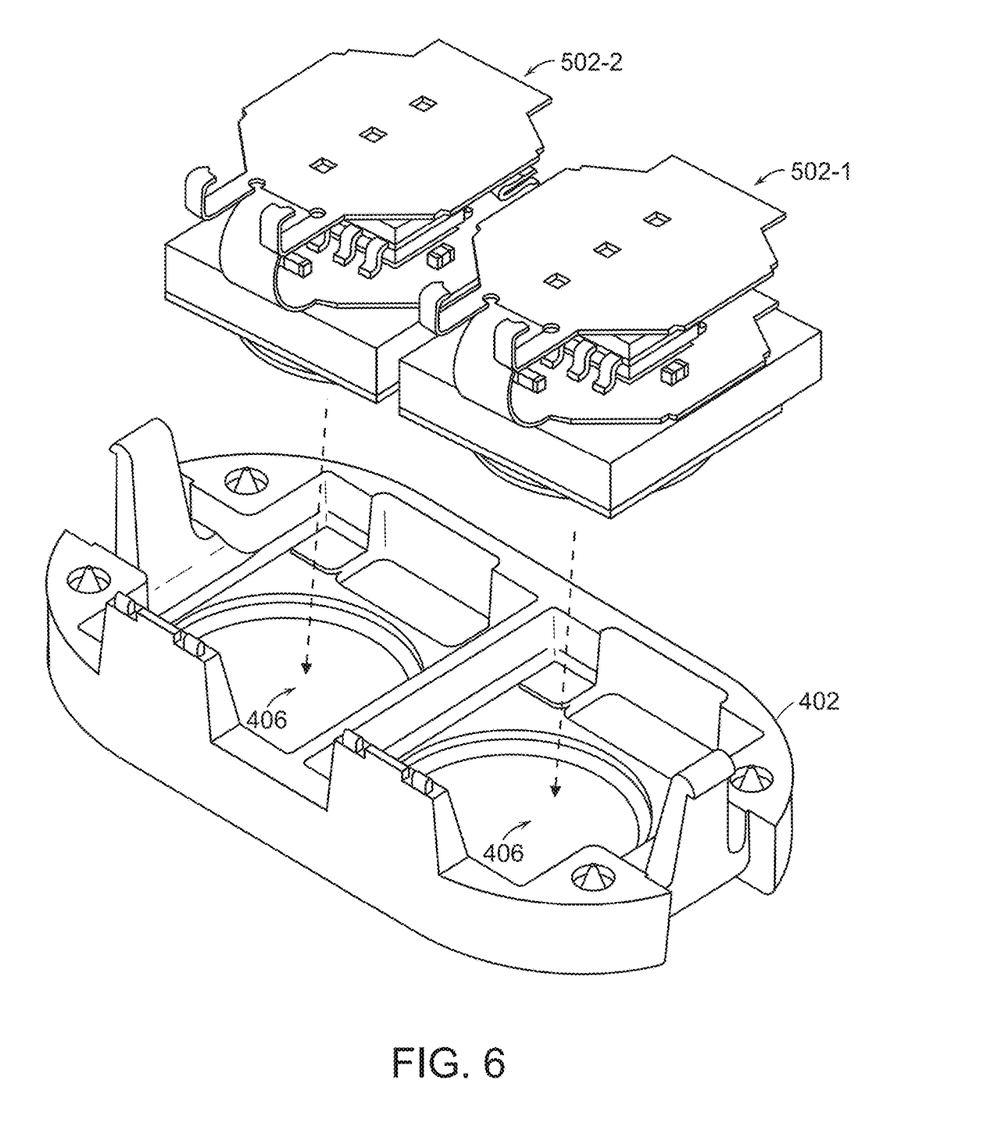
FIGS. 6 and 7 are perspective views of the placement of the pressure sensing assemblies of FIGS. 5A-5C in the base cover portion of FIG. 4.
Figure 7:
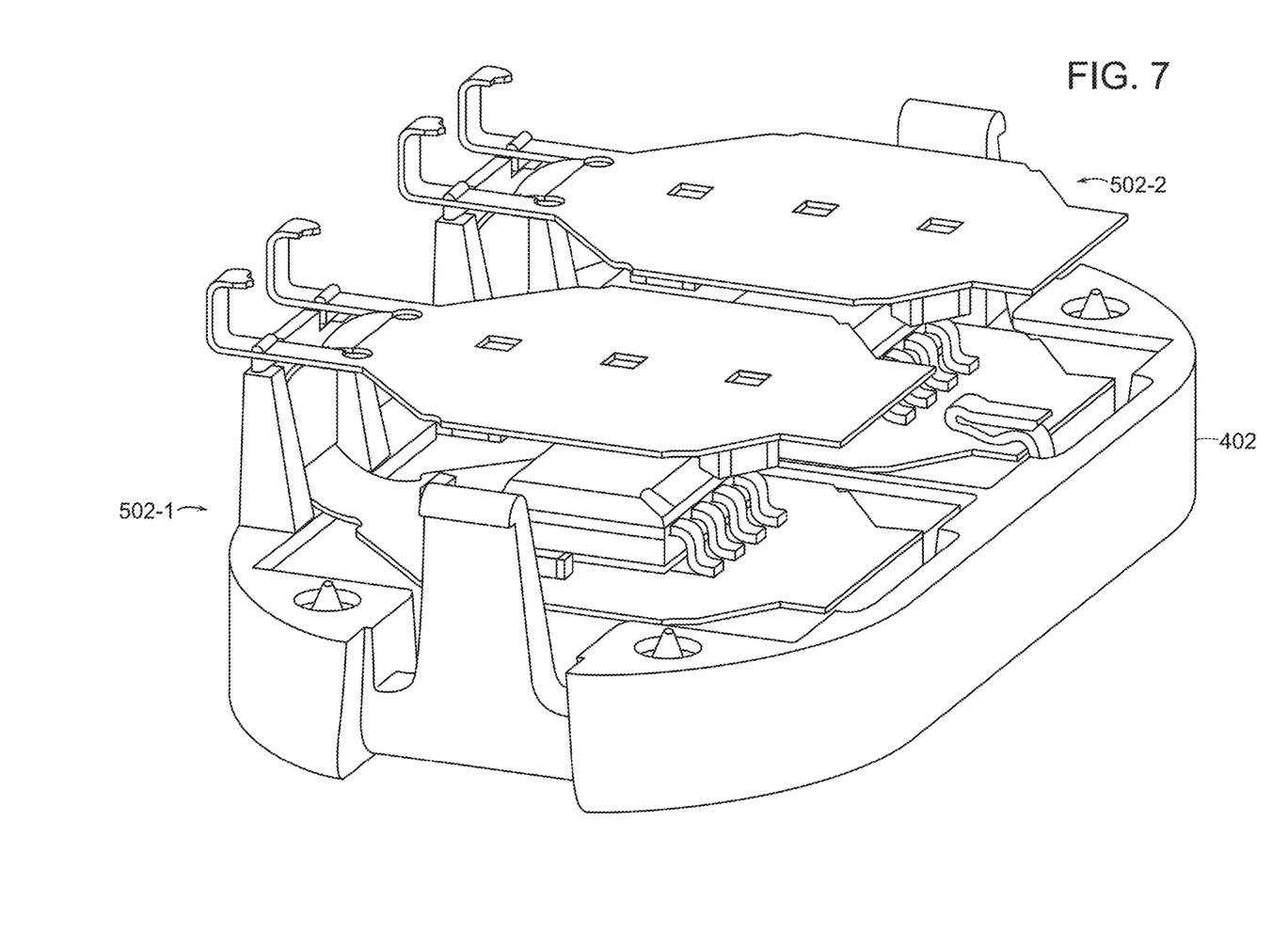

Each opening 406 in the base cover portion 402 is configured to receive a respective sensing assembly 502, as shown in FIGS. 6 and 7, and to hold the sensing assembly 502 in place. The base cover portion 402 is also configured such that the internal seal 510 extends sufficiently from the bottom of the base cover portion 402 to couple with the bottom of the chamber 302 of the housing 102.

Figure 8:
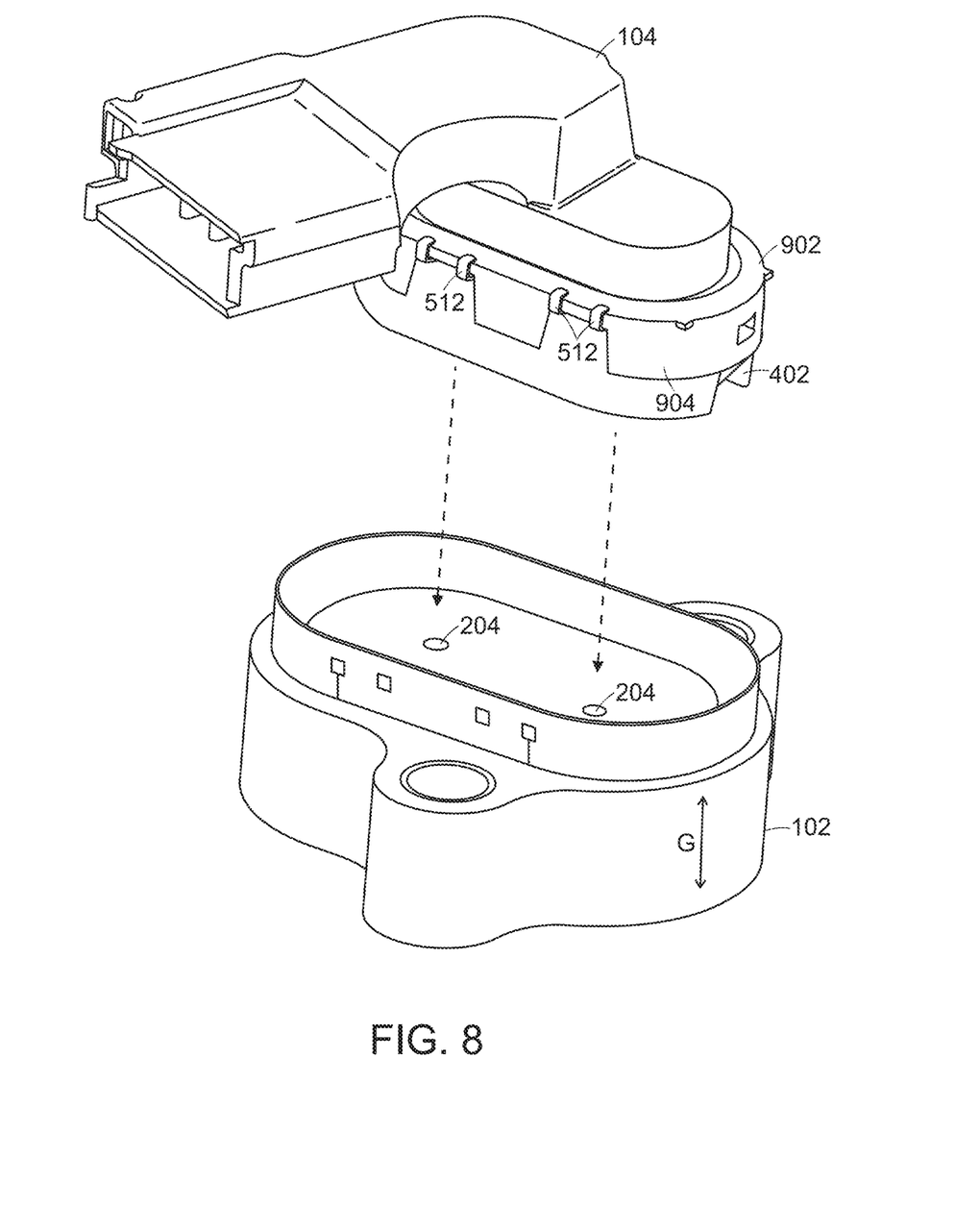
FIG. 8 is a perspective view of the placement of the base and the base cover portion into the housing portion of FIGS. 3A and 3B.

The base 104 includes a flange 902 and lower structural portion 904 configured to couple with the base cover portion 402, as shown in FIG. 8. The base 104 is placed over, i.e., snapped onto the base cover portion 402 by operation of the fingers 407-1, 407-2 and the corresponding openings in the lower structural portion 904. The combined base cover portion 402 and base 104 are then positioned in the housing 102. Each sensing assembly 502 is sealed and isolated from the other. As a result, each sensing assembly 502 is fluidly coupled to a respective inlet 204 and isolated from the other inlet 204.

Figure 9:
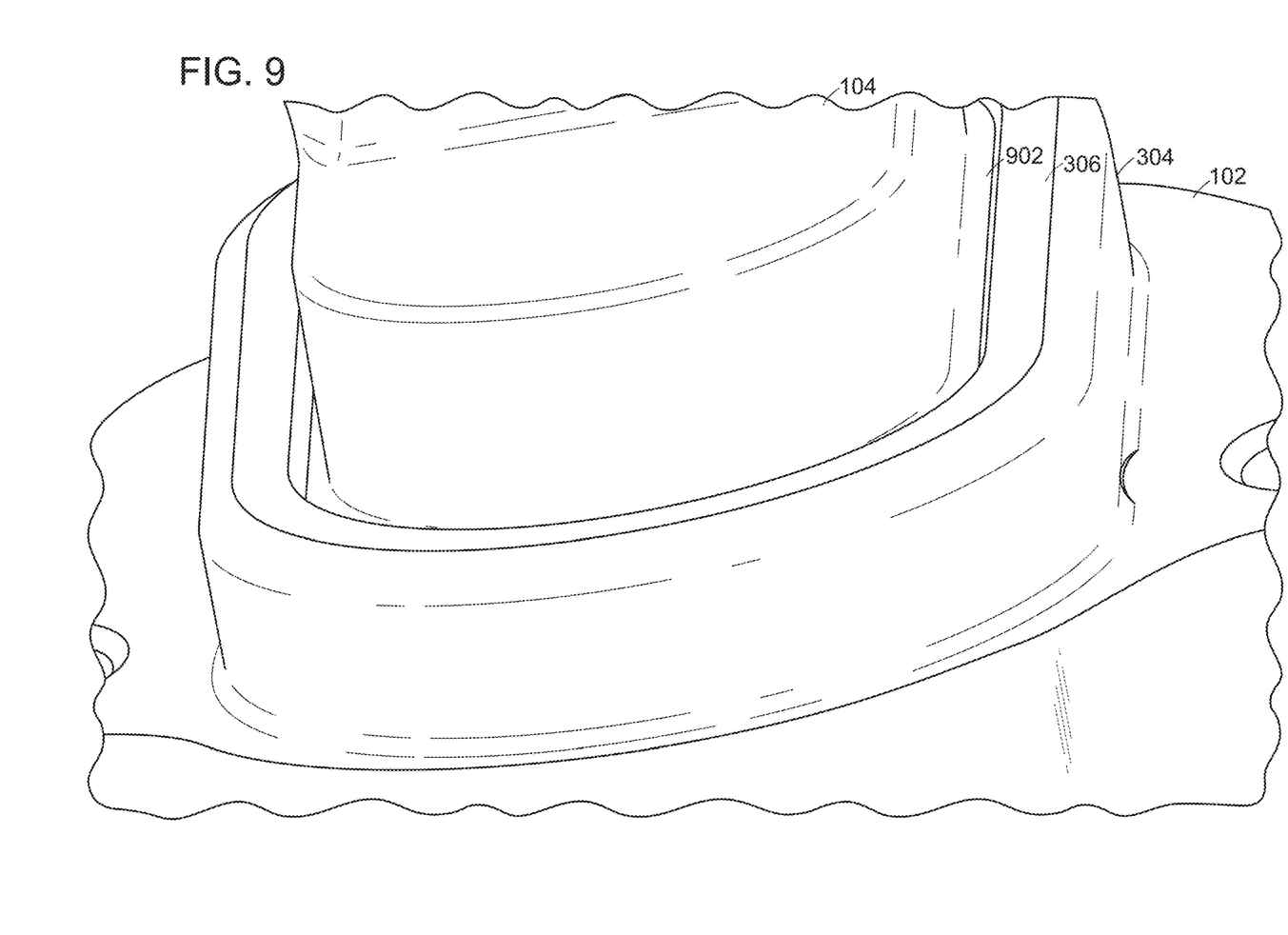
FIG. 9 is a close-up view of the crimp geometry of the housing about the base.
Figure 10:
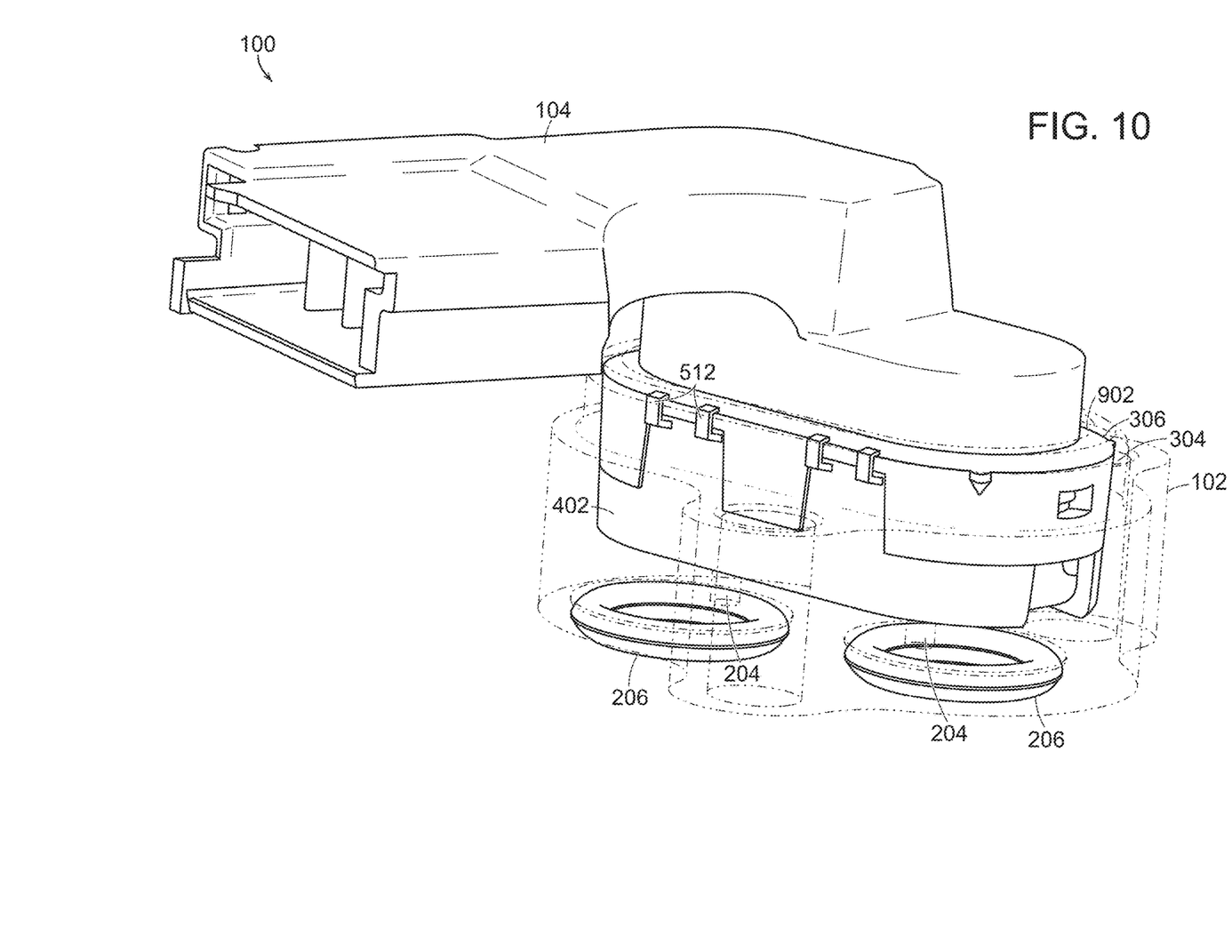
FIG. 10 is a partial transparent view of the pressure sensing apparatus of FIG. 1.

The base 104 is set in place, and the integrity of the isolation of the sensing assemblies 502 is maintained, by crimping the upper lip 306 over the flange 904, for the entire periphery of the oval opening, as shown in FIG. 9. Once crimped, each sensing assembly 502 is fluidly coupled to a respective inlet 204, as shown in FIG. 10. Advantageously, the base cover portion 402 and the base 104, when held in place by the crimped housing 102, allow the respective sensing assembly to 502 to measure a pressure of a fluid through the respective inlet 204. Further, the ground clips 512 couple to the housing 102 during the crimping operation.

In one embodiment, the housing 102 is made from extruded aluminum. In order to provide the strongest crimp, the grain of the extruded aluminum should be arranged in a direction G as shown in FIG. 8.

Figure 11:
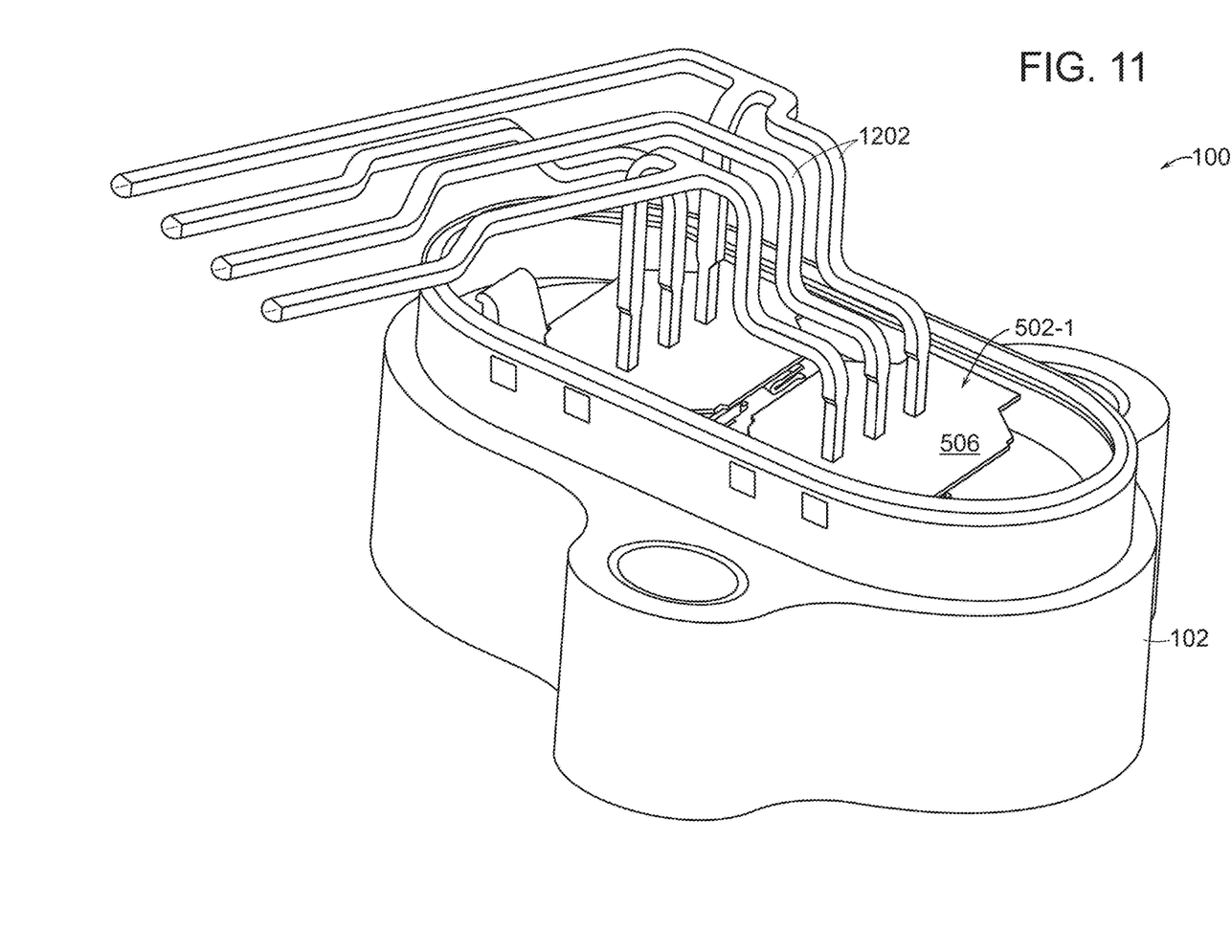
FIG. 11 is a cut-away view of the pressure sensing apparatus of FIG. 1.

Each sensing assembly 502 needs to receive power as well as have a mechanism to output respective pressure measurements. In one embodiment, referring to FIG. 11, the base 104 (not shown) includes a plurality of leads 1202 that couple to the flex circuits 506 in order to provide common power and ground to the sensing assemblies 502 as well as pass the measurement signals out to a central system, for example, an automotive control system.

Figure 12A:
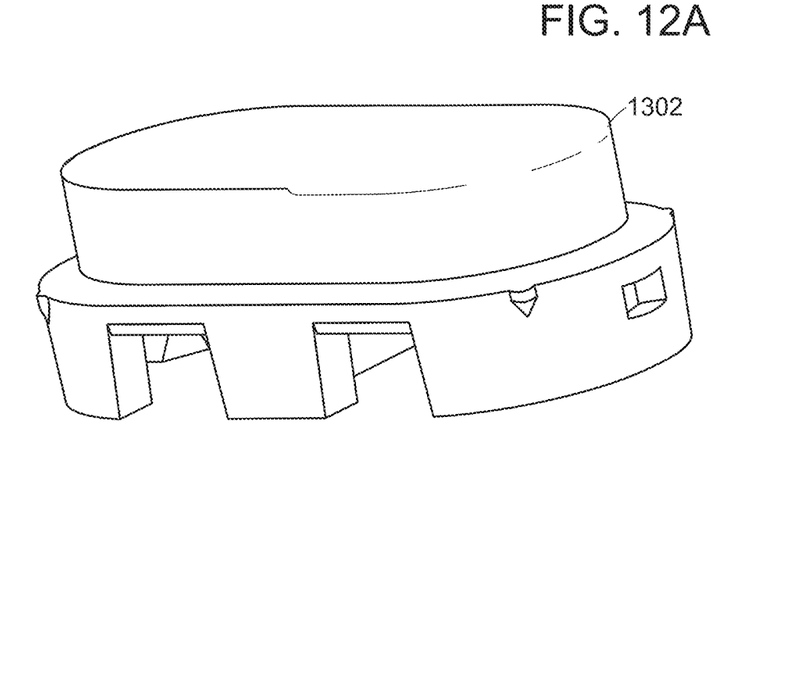
FIGS. 12A and 12B are perspective views of an alternate embodiment of the pressure sensing apparatus.
Figure 12B:
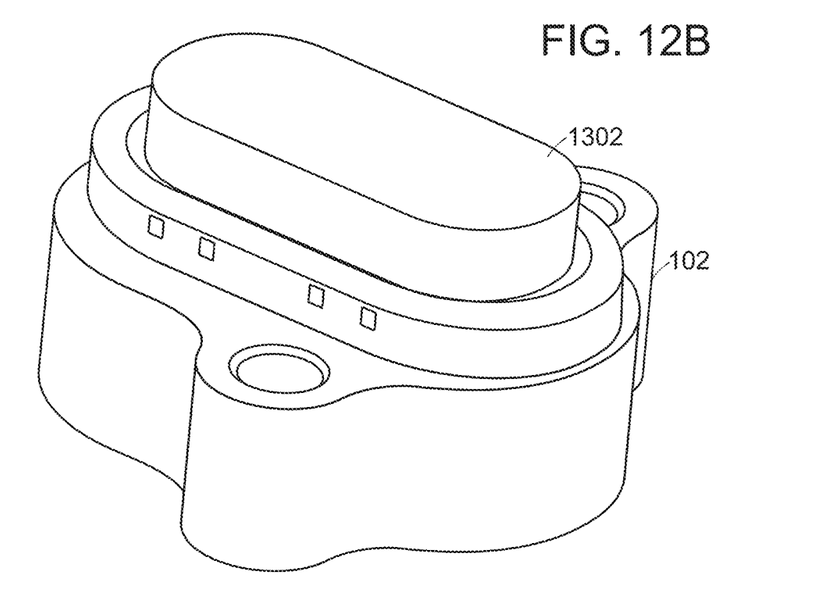

Alternatively, a cap 1302, as shown in FIGS. 12A and 12B, that includes, for example, a battery and wireless communications components (not shown) could be provided. The cap 1302 would be configured to couple to the fingers 407-1, 407-2 of the base cover portion 402 (not shown) similar to that which has been described above.

Advantageously, the pressure sensing apparatus of the present disclosure can be implemented to provide either differential, redundant or independent fluid pressure measurements depending on the functionality provided in the support circuitry. Further, while an example embodiment of two sensors is presented, one of ordinary skill in the art will understand how more than two sensors could be provided in the apparatus without undue experimentation.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular embodiments, the present disclosure is not intended to be limited to the particulars disclosed herein; rather, the present disclosure extends to all functionally equivalent structures, methods and uses, such as are within the scope of the claims.

The invention claimed is:

1. A sensing apparatus, comprising:
a base cover defining a plurality of sections, each of the sections having a respective base cover opening;
a plurality of sensors, each sensor positioned in a respective base cover section, wherein a portion of each sensor is positioned in the respective base cover opening;
a base, comprising a flanged portion, coupled to the base cover and configured to define a plurality of chambers, each chamber corresponding to a respective base cover opening; and
a housing having a bottom surface with a plurality of inlets defined therein, the housing comprising an extruded material having a grain and a grain direction, where the grain direction is transverse to the bottom surface,
wherein the base and base cover are positioned in the housing such that the base extends through an opening defined in the housing,
wherein each inlet is in fluid connection with a respective base cover opening, and
wherein an edge of the housing is crimped to couple to the flanged portion of the base and a direction of the grain in the crimped edge is at an angle with respect to a direction of the grain in a non-crimped portion of the housing.

2. The sensing apparatus of claim 1, wherein each of the housing, base and base cover comprises an oblong shape.

3. The sensing apparatus of claim 1, wherein each sensor comprises a pressure sensor.

4. The sensing apparatus of claim 1, wherein each sensor comprises a processing circuit.

5. The sensing apparatus of claim 1, wherein the housing comprises aluminum.

6. The sensing apparatus of claim 1, wherein each sensor comprises a capacitive sense element assembly.

7. A pressure sensing apparatus, comprising:
an oblong base cover portion comprising first and second base cover sections, each of the first and second base cover sections having an opening defined therein;
first and second sensors positioned, respectively, in the first and second base cover sections, a portion of each sensor positioned in the respective opening;
an oblong base, comprising a flanged portion, the base coupled to the base cover portion to define first and second separate chambers corresponding, respectively, with the first and second base cover openings; and
an oblong housing, disposed about the base cover portion and base, the housing having first and second inlets defined in a bottom surface and in fluid connection with the respective first and second base openings, the housing defining an oblong opening through which the base extends and the housing comprising an extruded material having a grain and a grain direction, where the grain direction is transverse to the bottom surface,
wherein an edge of the housing oblong opening is crimped to couple to the flanged portion of the base and a direction of the grain in the crimped edge is at an angle with respect to a direction of the grain in a non-crimped portion of the housing.

8. The pressure sensing apparatus of claim 7, wherein each sensor comprises a pressure sensor.

9. The pressure sensing apparatus of claim 7, further comprising:
first and second processing circuits coupled, respectively, to the first and second sensors.

10. The pressure sensing apparatus of claim 7, wherein each of the first and second sections of the base cover portion is configured to receive, and maintain in place, the respective sensor.

11. The pressure sensing apparatus of claim 7, wherein the housing comprises aluminum.

12. The pressure sensing apparatus of claim 7, wherein each sensor comprises a capacitive sense element assembly.

* * * * *